United States Patent
Kangas et al.

(10) Patent No.: US 8,581,532 B2
(45) Date of Patent: Nov. 12, 2013

(54) CONTROL METHOD FOR FREQUENCY CONVERTER

(75) Inventors: Jani Kangas, Espoo (FI); Jussi Rantanen, Espoo (FI)

(73) Assignee: ABB Oy, Helsinki (FI)

( * ) Notice: Subject to any disclaimer, the term of this patent is extended or adjusted under 35 U.S.C. 154(b) by 357 days.

(21) Appl. No.: 13/009,245

(22) Filed: Jan. 19, 2011

(65) Prior Publication Data

US 2011/0181212 A1     Jul. 28, 2011

(30) Foreign Application Priority Data

Jan. 25, 2010   (EP) .................................. 10151532

(51) Int. Cl.
*H02P 23/12*      (2006.01)

(52) U.S. Cl.
USPC .................. 318/400.14; 318/400.34; 318/503

(58) Field of Classification Search
USPC ............... 318/164, 400.14, 400.34, 503, 494, 318/798, 811, 432, 603, 610, 460
See application file for complete search history.

(56) References Cited

U.S. PATENT DOCUMENTS

| | | | |
|---|---|---|---|
| 5,752,813 A | 5/1998 | Tyner et al. | |
| 2006/0022630 A1 | 2/2006 | Spurr et al. | |
| 2006/0168984 A1 | 8/2006 | Myers | |
| 2009/0249699 A1 | 10/2009 | Yulkowski | |
| 2012/0169260 A1* | 7/2012 | Scheit et al. | 318/400.14 |

FOREIGN PATENT DOCUMENTS

| | | |
|---|---|---|
| GB | 1 345 580 A | 1/1974 |
| GB | 2 136 990 A | 9/1984 |
| GB | 2 282 639 A | 4/1995 |
| JP | 2009-214952 A | 9/2009 |

OTHER PUBLICATIONS

European Search Report issued on Jul. 14, 2010.

* cited by examiner

*Primary Examiner* — Karen Masih

(74) *Attorney, Agent, or Firm* — Buchanan Ingersoll & Rooney PC

(57) ABSTRACT

A motor drive and a method in connection with a motor drive including a frequency converter are provided. The motor of the drive is connected to a load, and the motor is controlled with the frequency controller. The method includes the steps of converting changes in electrical quantities of the motor caused by actions affecting the load into observations representing the changes, selecting control symbols on the basis of matching of the sequences of observations with a set of valid patterns, and controlling the converter based on the selected symbols.

18 Claims, 3 Drawing Sheets

CONTROL METHOD FOR FREQUENCY CONVERTER

RELATED APPLICATION

This application claims priority under 35 U.S.C. §119 to European Patent Application No. 10151532.8 filed in Europe on Jan. 25, 2010, the entire content of which is hereby incorporated by reference in its entirety.

FIELD

The present disclosure relates to a method in connection with a motor drive comprising a frequency converter, wherein the motor of the drive is connected to a load.

BACKGROUND INFORMATION

There are many devices powered with electricity and operated by people. An example of this human-machine interaction is a motor drive attached to a load and operated by a user. Nowadays, the motor drive usually includes a frequency converter.

The frequency converter can receive control parameters through an external interface, which can be a front panel on the converter or an electrical/optical communications interface, for example. However, there is no natural, intuitive way for a user to interact directly with the motor drive.

SUMMARY

An exemplary embodiment provides a method in connection with a motor drive including a frequency converter. The motor of the drive is connected to a load, the motor is controlled with the frequency controller, and the motor drive is configured to be controlled by a user. The exemplary method includes converting changes in electrical quantities of the motor caused by user actions affecting the load into observations representing the changes. The exemplary method also includes selecting control symbols on the basis of matching sequences of observations with a set of valid patterns representing the user actions to be recognized. In addition, the exemplary method includes controlling the frequency converter on the basis of the selected symbols.

An exemplary embodiment provides a motor drive including a frequency converter, and a motor connected to a load and configured to be controlled by the frequency controller. The exemplary motor drive also includes means for converting changes in electrical quantities of the motor caused by actions that affect the load into observations representing the changes. In addition, the exemplary motor drive includes means for selecting control symbols on the basis of matching sequences of observations with a set of valid patterns. The exemplary motor drive also includes means for controlling the frequency converter on the basis of the selected symbols.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
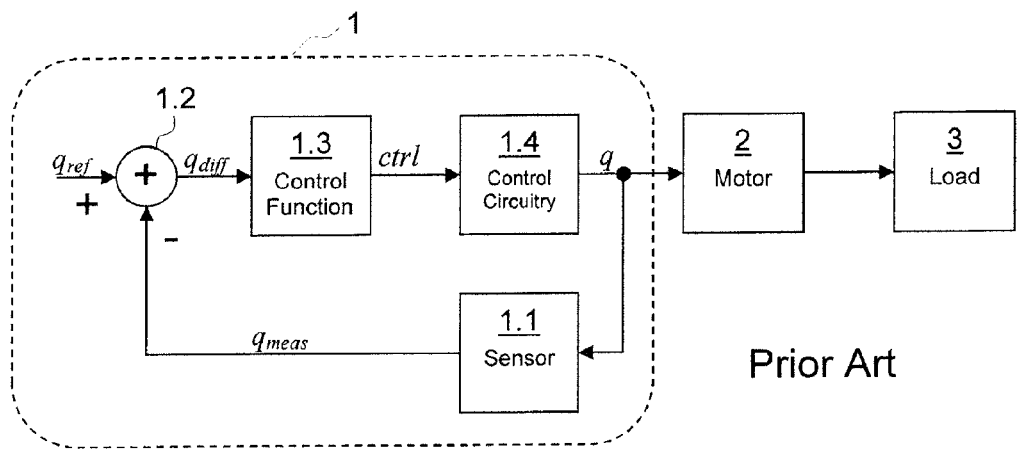
FIG. 1 illustrates a simplified block diagram of an arrangement with a known frequency converter.

Exemplary embodiments of the present disclosure provide a motor drive and a method for controlling a frequency converter of a motor drive in which the motor of the drive is connected to a load and the motor is controlled by the frequency converter. The exemplary motor drive and method of the present disclosure advantageously permit a user to interact directly with the motor drive in a natural, intuitive way.

An exemplary arrangement within the scope of the present disclosure includes a motor drive and a load. The motor drive can also include a converter. Exemplary embodiments of the present disclosure are based on the realization that user actions affecting the load cause changes in electrical quantities of the motor. Certain quantities are measured by the converter and each action thus generates a measurable pattern. The converter, using a pattern recognition algorithm, matches the pattern caused by the user action with a set of valid patterns.

These valid patterns represent the actions which can be recognized. If a pattern caused by the user action matches well enough with a valid pattern, in other words, it is recognized, the converter is considered to have received a command. The method according to the present disclosure can thus be implemented to provide a user interface. The valid patterns can be pre-programmed or in some embodiments of the present disclosure they can be taught.

The actions affecting the load can also be unintentional by nature. In embodiments of this kind, the method according to the present disclosure acts as a safety feature as it may be utilized to recognize faults or accidents. The method according to the present disclosure can also be used as pre-emptive safety feature as it may spot an imminent accident or fault and apply preventive measures to avoid the fault or accident from happening.

Exemplary embodiments of the method of the present disclosure provide the possibility to implement moving devices reacting to physical user contact. The capability to learn new patterns opens unlimited possibilities to what kind of patterns different applications can recognize. The user does not need a separate device to control the frequency converter. From the user point of view, the frequency converter can thus be a "black box" device.

The possibility to recognize accidents or faults instantly or even preemptively increases safety greatly. The possibility to manipulate the control process directly after an accident or a fault, and thus remove the fault or save the accident victim, further improves safety.

Various features of the present disclosure can be implemented by means of a processor executing a software algorithm recorded on a non-transitory computer-readable recording medium (e.g., a ROM, hard disk drive, flash memory, optical memory, etc.). According to an exemplary embodiment, the processor can be constituted by any computer processor/DSP/FPGA/ASIC-controlled frequency controller. The method thereby eliminates the need for external sensors thus making arrangements simpler and cheaper.

Exemplary embodiments of the present disclosure provide a method in connection with a motor drive which includes a frequency converter, wherein the motor of the drive is connected to a load. In known techniques, the control objective in a frequency converter is to minimize the difference between an internal reference and a measured value of certain electrical quantity.

The term "means" is used herein to describe structural features illustrated in the various drawings. The described "means" can each be implemented by analog and/or digital circuitry, including, for example, a hardware module (e.g., computer processor) executing a program recorded on a non-transitory computer-readable recording medium, e.g., a non-volatile memory, a hard disk drive, optical memory, flash memory, etc. The analog and/or digital circuitry for achieving the functionality of the described "means" is not limited to a computer processor. Rather, the described "means" elements can be constituted by any analog and/or digital circuitry for performing the described functions of the various "means" elements.

FIG. 1 illustrates a simplified block diagram of a known arrangement with a frequency converter 1. The converter 1 controls and supplies power to the motor 2. The converter 1 has an internal reference $q_{ref}$ for an electrical quantity q. The converter 1 also includes means 1.1 (e.g., sensor) for measuring the electrical quantities q, and producing a measured value $q_{meas}$ for the electrical quantity. An electrical quantity q can, for example, be motor current, voltage, torque or rotational speed of the motor. The torque and the rotational speed can be considered electrical quantities since they can be estimated from other electrical quantities of the motor. The converter 1 includes means 1.2 (e.g., comparator) for forming a difference term $q_{diff}$ for the difference between the reference $q_{ref}$ and the measured value $q_{meas}$. A control function 1.3 is used to form a control signal ctrl, responsive to the difference term $g_{diff}$. The control signal ctrl is used to control the electrical circuitry 1.4 of the converter 1. The electrical circuitry 1.4 includes means (e.g., control circuitry) for controlling and supplying power to the motor 2. The motor 2 supplies the power to a load 3. The load 3 may be non-constant. A change in the load 3 causes the electrical quantities of the motor 2 to change. These changes may be observed in the measured value $q_{meas}$ of the electrical quantities. The converter 1 compensates for these changes by controlling the motor 2 so that the control objective is fulfilled. Actions subjected to the load 3 also cause changes in electrical quantities of the motor 2.

As these changes may be observed in the measured value $q_{meas}$ of the electrical quantities, it is possible to extend the control objective of known control methods to also recognize commands given to the converter 1 through actions that affect the load, thus making the method act as a user interface. The actions may, for example, be gestures or movements made by a user manipulating the load 3. The previous example illustrates a scheme with one internal reference $q_{ref}$, one measurement $q_{meas}$, one difference term $q_{diff}$ and one control signal ctrl. However, in other exemplary embodiments of the present disclosure, the amount of the signals/terms may be more than one. Thus, references to the signals herein may mean one signal or a group of signals.

Figure 2:
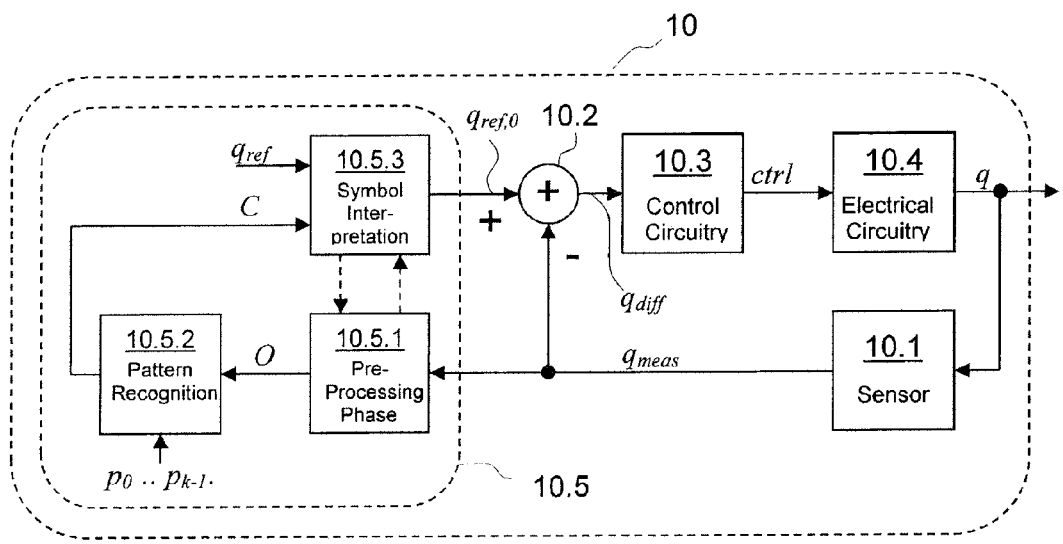
FIG. 2 illustrates a simplified block diagram of a converter embodying a method according to an exemplary embodiment of the present disclosure.

FIG. 2 illustrates a simplified block diagram of a converter 10 and of a method of controlling the converter 10 according to an exemplary embodiment of the present disclosure. The converter 10 in FIG. 4 includes means 10.1 (e.g., sensor) for measuring the electrical quantities q and means 10.2 (e.g., comparator) for forming a difference term $q_{diff}$. A control function 10.3 (e.g., control circuitry) is used to form a control signal ctrl. The control signal ctrl is used to control the electrical circuitry 10.4. The known control method is extended by a pattern interpretation algorithm 10.5. According to an exemplary embodiment of the present disclosure, the method uses measurements $q_{meas}$ of a certain electrical quantity or electrical quantities of the motor. The method according to the present disclosure may include a pre-processing phase 10.5.1 so that the measurements $q_{meas}$ are suitable for a pattern recognition phase 10.5.2. The pre-processing phase 10.5.1 may include steps of filtering, and/or scaling and/or other forms of signal processing. The pre-processing phase 10.5.1 may convert the measurements into an observation sequence O, wherein any observation o is selected from a limited set of possible choices. A sample of the resulting signal/signals after the pre-processing phase 10.5.1 is hereafter called an observation o.

Figure 3:
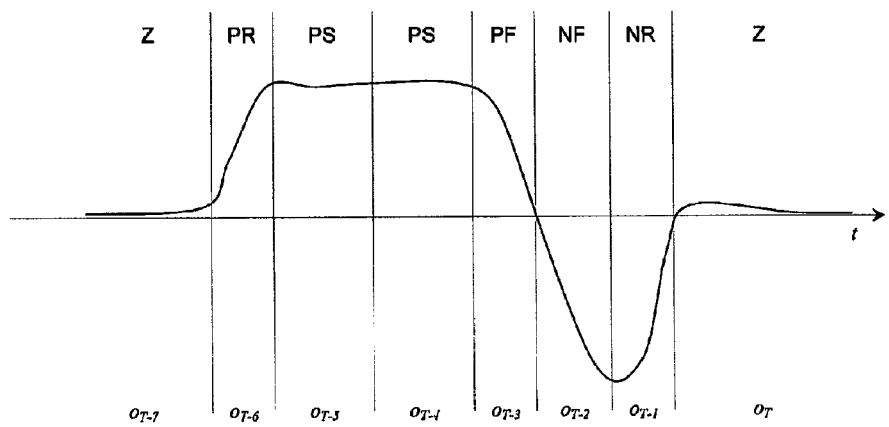
FIG. 3 illustrates an example of converting a measurement signal $q_{meas}$ of an electrical quantity into a sequence of observations, according to an exemplary embodiment of the present disclosure.

FIG. 3 illustrates an example of converting a measurement signal $q_{meas}$ of an electrical quantity into a sequence of observations. The abbreviations in FIG. 3 have the following meanings:

PR Measurement $q_{meas}$ is bigger than the reference $q_{ref}$ and rising

PS Measurement $q_{meas}$ is bigger than the reference $q_{ref}$ and staying at the same level PF Measurement $q_{meas}$ is bigger than the reference $q_{ref}$ and falling NR Measurement $q_{meas}$ is smaller than the reference $q_{ref}$ and rising NS Measurement $q_{meas}$ is smaller than the reference $q_{ref}$ and staying at the same level PF Measurement $q_{meas}$ is smaller than the reference $q_{ref}$ and falling The signal $q_{meas}$ in FIG. 3 is converted into observations $o_{T-7} \ldots o_T$, which are used later in a pattern recognition phase, similar to the pattern recognition phase 10.5.2 in FIG. 2, for example.

It is known that frequency converters can control motors using internal references for the electrical quantities of the motor. In other words, the converter has information on what the electrical quantities of the motor should be and controls the motor so that the measurements are steered towards the references. Returning to FIG. 2, an exemplary embodiment of the method according to the present disclosure provides that these reference values $q_{ref}$ can also be taken into account in the pre-processing phase 10.5.1.

Figure 4:
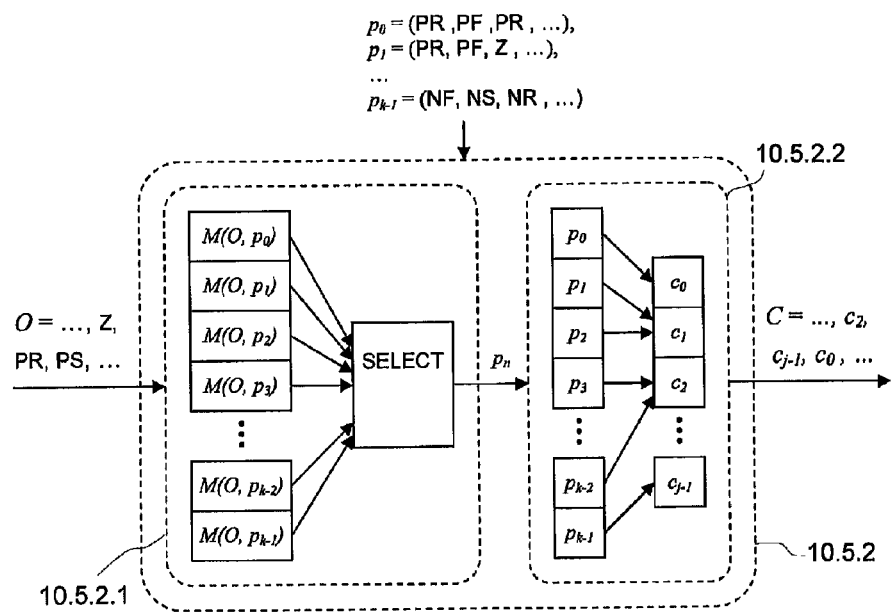
FIG. 4 illustrates a pattern recognition phase in greater detail, according to an exemplary embodiment of the present disclosure.

FIG. 4 illustrates in greater detail the pattern recognition phase 10.5.2 following the pre-processing phase 10.5.1. The pattern recognition phase 10.5.2 can include a matching phase 10.5.2.1, which matches the observation sequence O, made of consecutive observations $o_{n-i} \ldots o_n$, with a set of valid patterns, which include k patterns $p_0 \ldots p_{k-1}$. The information required to identify the valid patterns $p_0 \ldots p_{k-1}$ is stored in the converter 10. The information required to identify the valid patterns $p_0 \ldots p_{k-1}$ may be pre-programmed, or in some embodiments of present disclosure, it may be programmed to the converter 10 afterwards.

There are several known pattern recognition algorithms which can be used in the method according to the present disclosure, one example being the Hidden Markov Model HMM, which is widely used in speech and gesture recognition applications. An algorithm for calculating Levenshtein distance, used in computer mouse gesture recognition, can also be used in the method according to the present disclosure.

As illustrated in FIG. 4, pattern recognition algorithms can match the observation sequence with each of the valid patterns $p_0 \ldots p_{k-1}$ using a matching function M, and the best matching pattern $p_n$ is selected, assuming that a minimum limit for the match value is reached. The valid patterns $p_0 \ldots p_{k-1}$ are then linked to j control symbols $c_0 \ldots c_{j-1}$. A pattern linking phase 10.5.2.2 produces a stream C of control symbols corresponding to the recognized patterns. In the example of FIG. 4, the information required to identify the valid patterns $p_0 \ldots P_{k-1}$ is in the form of sequences of observations, but the information can also include other kind of data, depending on the algorithm used to recognize the valid patterns $p_0 \ldots p_{k-1}$. More than one valid pattern can generate the same control symbol. For instance, different users may have different gestures generating different patterns for the same control operation of the device.

Returning to FIG. 2, the stream C of control symbols can be used to control the converter 10 using a symbol interpretation phase 10.5.3. A single control symbol or a sequence of control symbols represents a control operation which can be executed in the converter. In some embodiments of the present disclosure, the symbol interpretation phase 10.5.3 can include a decision phase for determining if a control operation indicated by the recognized patterns can be executed. Some control operations may not be executable under certain operating conditions.

Other information, such as the internal references $q_{ref}$ and measured values $q_{meas}$ of the electrical quantities, can be used in the decision making. The symbol interpretation phase 10.5.3 can include a state machine to accomplish the aforementioned tasks. If the control operation is valid and executable, an exemplary embodiment of the method according to the present disclosure provides that the operation can be executed in the converter 10, for example by manipulating the references $q_{ref,0}$ and thus affecting the inputs of the control function 10.3.

In case of complicated sequences of control symbols, the symbol interpretation phase 10.5.3 can include a pattern recognition sub-phase, maybe similar to the pattern recognition phase 10.5.2. This enables the method according to the present disclosure to recognize "patterns of patterns". For example, a person walking on a treadmill generates a pattern on each step, and the consecutive steps generate a sequence of patterns. The symbol interpretation phase 10.5.3 can also include means for sending data to a receiver external to the converter. These means can be implemented by any suitable communication circuitry and/or a computer processor which can transmit the data via a wired and/or wireless medium. A user or a monitoring system can receive information about the actions subjected to the load.

Any component of the exemplary method may for instance be implemented by a processor, a DSP or a programmable logic device (PLD), for example, a FPGA. For instance, the method may be implemented by a processor provided in a computing device (e.g., a computer), where the processor executes a computer program recorded on a non-transitory computer-readable recording medium (e.g., non-volatile memory such as a ROM, hard disk drive, flash memory, optical memory, etc.) to implement features of the method according to any of the exemplary embodiments described herein.

A generic example of an embodiment of the present disclosure is a user interface in association with a motor drive and a load, where the motor is controlled using commands provided by the method according to the disclosure. The motor drive includes a converter (e.g., the converter 10), which further includes means for implementing the method according to the present disclosure. A user may, for example, accelerate the shaft of the motor to a desired rotational speed and then make a back-and-forth gesture.

The user actions cause changes in the electrical quantities. These changes are measured by the converter. The converter matches patterns in the measurements generated by these actions with a set of patterns stored in a memory (e.g., a non-transitory computer-readable medium) of the converter. When the converter recognizes a pattern generated by the increase in rotational speed, it converts the pattern to a command symbol. The converter then determines that such symbol starts a command symbol sequence for setting the rotational speed and stores the value of the measured rotational speed. Next, the converter recognizes the pattern generated by the back-and-forth gesture and converts the pattern to another, terminating, command symbol. The converter determines that a command symbol sequence for setting the rotational speed is started and upon receiving the terminating symbol sets the stored value as the reference for the rotational speed. The frequency converter then continues to control the motor to rotate at the speed stored before the back-and-forth gesture.

Figure 5:
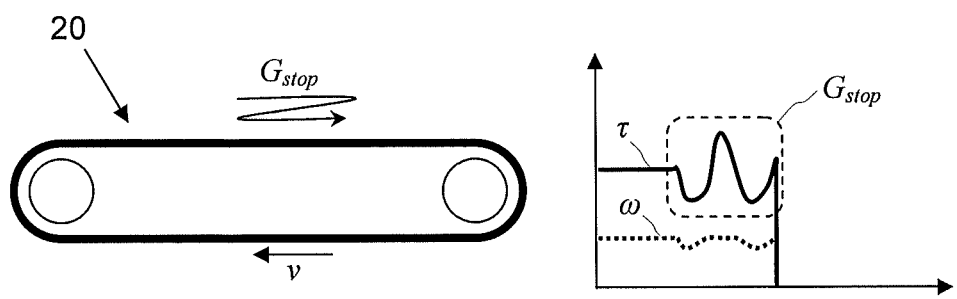
FIG. 5 illustrates an exemplary embodiment of the present disclosure in association with a motor drive and a conveyor belt as a load.

FIG. 5 illustrates an exemplary embodiment of the present disclosure in association with a motor drive and a conveyor belt 20 as an example of a load. The motor drive is operated by a user, for example, a shop assistant at the checkout of a grocery shop. The motor in the motor drive is powered by a frequency converter including means for embodying the method according to the present disclosure. The shop assistant may stop the checkout conveyor belt 20 by moving (and gently pressing) his/her hand on the conveyor belt 20 and making a back-and-forth gesture $G_{stop}$.

The gesture $G_{stop}$ causes changes in the electrical quantities, such as the rotational speed $\omega$ and/or torque $\tau$, of the motor. These changes form patterns and are measured by the converter. The converter matches the patterns in the measurements generated by these actions with a set of valid patterns stored in a memory of the converter. The set of valid patterns includes patterns representing user gestures for commands "start", "stop", "accelerate" and "decelerate". For instance, when the converter recognizes a pattern generated by a user's "stop" gesture $G_{stop}$, it generates a corresponding command symbol.

In this embodiment, a single control symbol may represent a command, and the converter can therefore set the reference for the rotational speed of the motor to zero. The shop assistant can thus start and stop the conveyor belt 20 just by making a hand gesture on the conveyor belt 20. In a similar manner, the shop assistant may start the conveyor belt again at a default speed by making another gesture. If the speed v of the conveyor belt 20 is not suitable, s/he may also accelerate or decelerate the speed v by brushing it in a desired direction. Again, in a manner similar to the example of the "stop" command, the pattern generated by the brushing gesture is recognized and the speed v is either accelerated or decelerated, depending on the direction of the brushing gesture.

The gestures for controlling the arrangement may be pre-programmed or they can be taught to the converter by the user. In the latter case, each user of the conveyor belt may have his/her own set of gestures for controlling the arrangement. Teaching the gestures may, for example, be done by repeating a pattern to be taught when the converter is set into a specific teaching mode.

Exemplary embodiments of the method according to the present disclosure can also be adjusted to act as surveillance or monitoring feature. An example of this is an embodiment in association with an escalator, which includes a motor drive with a converter that includes means of implementing the method according to the present disclosure. The method is adjusted to recognize patterns generated by people stepping on and off the escalator. This allows the escalator to be started and stopped without external sensors. It is also possible to calculate the amount of people using the escalator. This information in turn can be used to adjust the speed of the escalator. The information can also be forwarded to an external surveillance/monitoring system which keeps track on the flow of people.

In accordance with an exemplary embodiment, the method according to the present disclosure can also be used as a monitoring feature, in association with a conveyor belt powered by a motor drive comprising a converter. The converter further includes means of implementing the method according to the present disclosure and is adjusted to recognize and classify the patterns generated by objects falling on the conveyor belt. The converter can estimate the size, weight and shape of the objects by using the method according to the present disclosure, when the objects fall in a controllable manner. The converter may keep track of the objects on the conveyor belt and also forward the information to an external monitoring system.

The method according to the present disclosure can be adjusted to act as an assistive feature. An example of this is an arrangement in association with a motor drive comprising a converter and a door as a load. The door can be held closed by a motor drive. The converter further includes means of implementing the method according to the present disclosure. The method is adjusted to recognize the patterns generated by a user trying to open/close the door. When the converter recognizes such a pattern, it assists in the opening/closing by controlling the motor.

The method according to the present disclosure may also be utilized as a safety feature recognizing patterns generated by unintentional user actions or unwanted events. The method according to the present disclosure can be used, for example, as a safety feature in an embodiment in association with a treadmill powered by a motor drive including a converter. The converter further includes means for implementing the method of present disclosure. The method is adjusted to recognize the patterns generated by the steps of runner on the treadmill. On each step, a recognizable pattern is generated, and the converter converts it to a corresponding control symbol. The symbol interpretation phase of the method of the present disclosure keeps track of the interval of the symbols and if it determines that too radical a change in the interval has occurred, it activates a safety feature. This feature may be, for example, stopping the treadmill. The method can also include a means for preventing an imminent accident indicated by the generated patterns. For instance, the runner may be prevented from falling down by adjusting the balance of the runner by quickly changing the treadmill's speed.

Another embodiment serving as a safety feature is an arrangement with a carpet, capable of moving in two directions x and y, in connection with a motor drive including a converter. The converter in the motor drive further includes means for implementing the method of present disclosure. The method is adjusted to recognize patterns generated by the steps of people walking on the carpet. The carpet is normally stationary, but the converter may control the motor/motors to move it in order to avoid an accident, if the converter spots an anomaly in the patterns generated by the steps.

Another embodiment of the present disclosure serving as a safety feature is an arrangement including a motor drive powering a pump. The converter in the motor drive further includes means for implementing the method of present disclosure. The method is adjusted to recognize patterns generated by a foreign object blocking the pump. When the converter spots such patterns, the pump is shut down and is thus saved from breaking down.

Yet another embodiment of the present disclosure serving as a safety feature is an arrangement including a motor drive powering a circular saw sawing tree trunks into planks. The converter in the motor drive further includes means for implementing the method of present disclosure. The method is adjusted so that when the circular saw hits an obstacle, for example, a nail, the converter recognizes the pattern generated by the event and generates a corresponding control symbol. If the converter determines that the control symbol represents a serious event, it stops the saw. The converter may record the information about the event and/or use the information to determine when maintenance is required. There may be several different control symbols representing different events with different severity levels. The converter may also inform an external monitoring system about the events. For example, in case of hitting a nail, the external system may be informed and the plank/part of the plank with the nail on can be removed from the flow of planks coming from the circular saw.

The method according to the present disclosure can also be used to accomplish more than one objective. For instance, it may act as a safety feature and an assistive feature in the same embodiment, as in an embodiment in association with an arrangement of user operated large machinery. The machinery, for example a large roller, is powered by a motor drive including a converter. The converter further includes means for implementing the method according to the present disclosure. The method is adjusted to recognize events of something getting pinned/stuck in the roller, without an external sensor. In this event, the roller is stopped. However, when a user for some reason gets his/her hand/foot pinned in the roller, s/he may not be able to free himself/herself because of the large mass of the roller. The method is thus adjusted to recognize patterns generated by the user's attempts to rotate the roller. The converter assists the user by controlling the motor to rotate the roller in the desired direction with the desired speed.

It will be obvious to a person skilled in the art that, as the technology advances, the inventive concept can be implemented in various ways. The present disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method in connection with a motor drive comprising a frequency converter, wherein the motor of the drive is connected to a load, the motor is controlled with the frequency controller and the motor drive is configured to be controlled by a user, wherein the method comprises the steps of:
 at least one of measuring and estimating a value of at least one electrical quantity of the motor;
 forming at least one intermediate signal by at least one of scaling, filtering, and other means of processing the value;

forming observations from the intermediate signal, wherein the observations represent changes in the at least one electrical quantity caused by user actions affecting a load;

selecting control symbols on the basis of matching sequences of observations with a set of valid patterns representing the user actions to be recognized; and controlling the frequency converter on the basis of the selected symbols.

2. The method as claimed in claim 1, wherein selecting control symbols on the basis of the matching of the sequences of observations comprises the steps of:

matching sequences of observations based on changes in electrical quantities with the set of valid patterns;

selecting the best matching patterns in the set of valid patterns and if a minimum limit for the match value is reached; and using the selected patterns to generate corresponding control symbols.

3. The method as claimed in claim 1, wherein controlling the converter on the basis of the selected symbols comprises the steps of:

selecting a control operation to be executed on the converter on the basis of a control symbol representing a recognized pattern or a sequence of control symbols representing recognized patterns; and executing the control operation.

4. The method as claimed in claim 3, wherein the operating conditions based on the internal references and measurements/estimates of electrical quantities are taken into account in selecting the control operation.

5. The method as claimed in claim 1, comprising teaching the information required for the set of valid patterns by the user.

6. The method as claimed in claim 1, in association with a motor drive and a load, wherein the method comprises the steps of:

recognizing patterns generated by a user manipulating the load;

linking the recognized patterns to control symbols;

determining a control operation affecting the rotational speed of the motor in the motor drive on the basis of the control symbol or a sequence of the control symbols; and changing the rotational speed of the motor in the motor drive according the determined control operation.

7. The method as claimed in claim 1, in association with an arrangement comprising a motor drive and a conveyor belt as a load, wherein the method comprises the steps of:

recognizing patterns generated by a user pressing his/her hand on the conveyor belt and making a gesture by moving his/her hand;

linking the recognized patterns to control symbols;

determining a control operation on the basis of the control symbol or a sequence of the control symbols, the control operations comprising starting and/or stopping the conveyor belt or otherwise manipulating the rotational speed of the conveyor belt; and starting or stopping the conveyor belt or changing the rotational speed of the conveyor belt according to the determined control operation.

8. The method as claimed in claim 1, in association with an arrangement comprising a motor drive and an escalator as a load, wherein the method comprises the steps of:

recognizing patterns generated by a person stepping on and off the escalator;

linking the recognized patterns to control symbols;

determining control operations on the basis of the control symbol or a sequence of the control symbols, the operations comprising starting and/or stopping the escalator, affecting the speed of the escalator;

sending information about the amount of people using the escalator to an external monitoring system; and controlling the escalator according to the determined control operations.

9. The method as claimed in claim 1, in association with an arrangement comprising a motor drive and a conveyor belt as a load, wherein the method comprises the steps of:

recognizing patterns generated by objects falling on the conveyor belt;

linking the recognized patterns to control symbols representing information about the size, weight and/or shape of the objects;

determining the size, weight and/or shape of the objects, on the basis of the control symbol or a sequence of the control symbols; and sending the determined information about the size, weight and/or shape of the objects to an external monitoring system.

10. The method as claimed in claim 1, in association with an arrangement comprising a motor drive and a door as a load, wherein the method comprises the steps of:

recognizing patterns generated by a person trying to open and/or close the door;

linking the recognized patterns to control symbols;

determining the control operation on the basis of the control symbol or a sequence of the control symbols, the control operations comprising opening and closing the door; and assisting in opening or closing the door according the determined control operation.

11. The method as claimed in claim 1, in association with an arrangement comprising a motor drive and a treadmill as a load, wherein the method comprises the steps of:

recognizing patterns generated by the steps of a person running on the treadmill;

linking the recognized patterns to control symbols;

determining the interval between the control symbols;

applying preventive actions to prevent the person from falling down if the control symbols or an interval between the control symbols indicate that the person will soon fall down; and reducing the treadmill speed to zero if the control symbols or the interval between them indicate that the person has fallen down.

12. The method as claimed in claim 1, in association with an arrangement comprising a motor drive and a carpet, capable of moving in two directions as a load, wherein the method comprises the steps of:

recognizing patterns generated by the steps of a person walking/running on the carpet;

linking the recognized patterns to control symbols;

determining the interval between the control symbols; and applying preventive actions through controlling at least one motor with the converter to prevent the person from falling down if the control symbols or the interval between the control symbols indicate that the person will soon fall down.

13. The method as claimed in claim 1, in association with an arrangement comprising a motor drive and a pump as a load, wherein the method comprises the steps of:

recognizing patterns generated by a foreign object getting stuck in the pump;

converting the recognized patterns to a control symbol; and shutting the pump down upon receiving the control symbol.

14. The method as claimed in claim 1, in association with an arrangement comprising a motor drive and a circular saw for sawing tree trunks into planks as a load, wherein the method comprises the steps of:
   recognizing patterns generated by the circular saw hitting an obstacle;
   linking the recognized patterns to control symbols;
   shutting down the saw if a control symbol corresponds to an event of a predetermined severity;
   recording information in the control symbols;
   determining the need for maintenance using the recorded information; and
   informing an external monitoring system if maintenance is required based on the determination of the need for maintenance.

15. The method as claimed in claim 1, in association with arrangement of a user-operated large roller powered by a motor drive comprising a converter, wherein the method comprises the steps of:
   recognizing patterns generated by something getting pinned/stuck in the roller;
   linking the recognized patterns to control symbols;
   reducing the roller speed to zero, if the control symbols indicate that something has got pinned/stuck in the roller; and then
   recognizing patterns generated by the user trying to turn the roller;
   linking the recognized patterns to control symbols;
   determining the control operation on the basis of the control symbol or a sequence of the control symbols, the control operations comprising rotating the roller into the desired direction with the desired speed; and
   assisting in rotating the roller according the determined control operation.

16. The method as claimed in claim 1, wherein controlling the converter on the basis of the selected symbols comprises the steps of:
   selecting a control operation to be executed on the converter on the basis of a control symbol representing a recognized pattern or a sequence of control symbols representing recognized patterns; and
   executing the control operation.

17. The method as claimed in claim 16, wherein the operating conditions based on the internal references and measurements/estimates of electrical quantities are taken into account in selecting the control operation.

18. A motor drive comprising:
   a frequency converter;
   a motor connected to a load and configured to be controlled by the frequency controller;
   means for at least one of measuring and estimating a value of at least one electrical quantity of the motor;
   means for forming at least one intermediate signal by at least one of scaling, filtering, and other means of processing the value;
   means for forming observations from the intermediate signal, wherein the observations represent changes in the at least one electrical quantity caused by user actions affecting a load;
   means for selecting control symbols on the basis of matching sequences of observations with a set of valid patterns; and
   means for controlling the frequency converter on the basis of the selected symbols.

\* \* \* \* \*